United States Patent [19]
Curran

[11] 3,722,860
[45] Mar. 27, 1973

[54] CAGE VALVE ASSEMBLY

[75] Inventor: John R. Curran, Attleboro, Mass.

[73] Assignee: The Foxboro Company, Foxboro, Mass.

[22] Filed: Dec. 9, 1971

[21] Appl. No.: 206,248

Related U.S. Application Data

[63] Continuation of Ser. No. 42,426, June 1, 1970, Pat. No. 3,648,718.

[52] U.S. Cl.................................251/332, 251/282
[51] Int. Cl..............................................F16k 39/04
[58] Field of Search......251/282, 362, 356, 367, 210, 251/332; 137/625.3, 625.33, 625.35, 625.37, 454.6, 315, 269

[56] References Cited

UNITED STATES PATENTS 3,572,382   3/1971   Luthe..............................137/625.35

Primary Examiner—Henry T. Klinksiek
Attorney—Lawrence H. Poeton

[57] ABSTRACT

A simplified industrial process control valve utilizing a cage guided plug having an easily replaceable soft seat, two gasket construction, improved plug rim seal and an unpinned stem and plug assembly to provide bubble-tight shut off.

3 Claims, 5 Drawing Figures

INVENTOR.
JOHN R. CURRAN

Patented March 27, 1973

INVENTOR.

BY JOHN R. CURRAN

AGENT

CAGE VALVE ASSEMBLY

CROSS REFERENCE TO RELATED APPLICATION

This is a division of application Ser. No. 42,426 filed June 1, 1970, issued Mar. 14, 1972, as U. S. Pat. No. 3,648,718.

BACKGROUND OF THE INVENTION

1. Field of the Invention

This invention relates to cage valves used in industrial processes and has particular reference to the gasketing and sealing arrangements in such valves. Specifically this invention relates to those cage valves utilizing cage guided plugs and soft seats for flow shut off.

2. Description of the Prior Art

Cage valve structures are utilized for ease of assembly. They typically provide a metal-to-metal seal in the fully closed or no-flow position. Due to the limitations in the commercially practical materials and finishes available, this arrangement does not provide a high degree of shut-off capability. When the ability to shut off flow to the degree known as "bubble tight" is required, complex inserts formed of relatively soft materials such as plastic or rubber are positioned in the sealing area to prevent metal-to-metal contact.

There are difficulties inherent in the usual form of such soft seat inserts. They are usually very complicated, and difficult to install. There removal and replacement ordinarily requires substantial takedown of the valve. Although most forms of soft seat devices provide satisfactory sealing when new, they tend, when worn out, to hinder rather than aid the metal-to-metal seal available without them.

Other problems found in conventional cage valve designs include multiple gasketing arrangements requiring four or five separate gaskets to provide the bonnet-to-body, bonnet-to-cage top and cage bottom-to-body seals. This requires complicated assembly and is a typical source of valve malfunction.

A further problem encountered in conventional devices of this sort is the sealing of the plug against the cage. In balanced valves of the type having ports through the plug for communication between the volume vertically above the plug and the process fluid, the seal at the rim of the plug is critical in providing bubble-tight shut off. Conventional devices have extraordinary problems with this seal because the valve stem is usually secured to the plug by a pin in this area.

SUMMARY OF THE INVENTION

In order to eliminate the above described difficulties in prior art devices, the instant invention provides a valve structure utilizing cage type valve assembly where the main plug-seat metal-to-metal seal is aided by a soft seat seal supported by the hard seat, and held in position by the cage so that it is easily replaced. The structure further provides a plug affixed to the stem by screw threads instead of a pin. This allows the use of a simple piston ring seal at the plug rim held in place by a support ring and clip ring assembly. The cage rests on a compressible spiral wound gasket providing cage bottom to body sealing. The cage top and upper rim of the body are coplanar allowing the use of a simple single gasket between the coplanar surface and the bonnet.

DESCRIPTION OF THE PREFERRED EMBODIMENT

Figure 1:
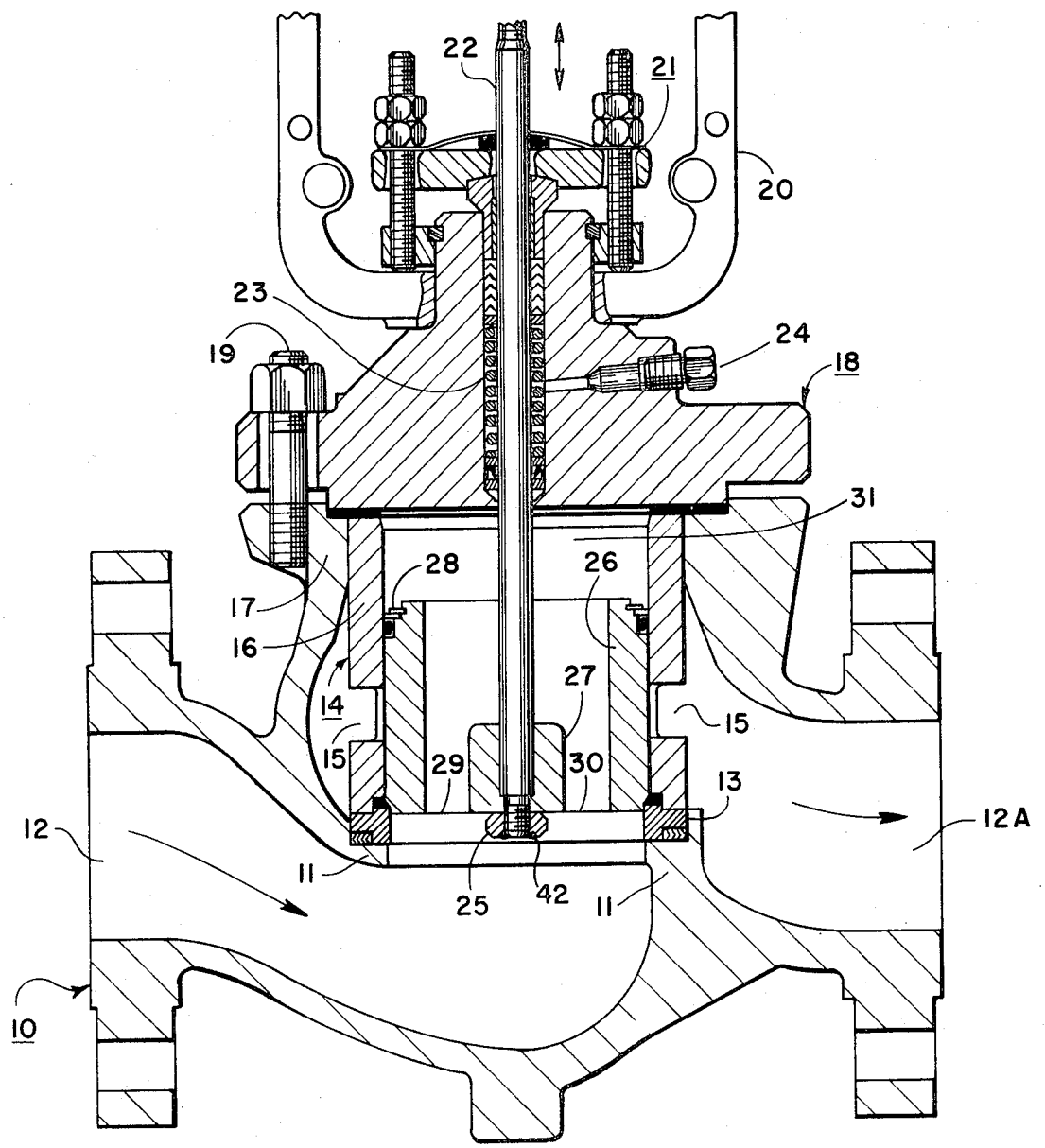
FIG. 1 is a vertical central section of a cage valve assembly.

Referring now to FIG. 1, the valve body 10 is provided with a shoulder 11 separating the inlet and the outlet passageways 12 and 12A. Seat ring assembly 13 rests on circular shoulder 11. Positioned concentrically with and directly above seat ring assembly 13 is the hollow cylindrical cage 14 which contains openings 15 communicating with outlet passageway 12A.

The circular top rim 16 of the cage is coplanar with the top rim 17 of the valve body. This area is described in greater detail in FIG. 3B. The cage is held in place against the shoulder 11 by compression applied by valve bonnet 18, which is secured to the valve body 10 by stud assemblies, one of which is shown, stud 19. Yoke 20, by which actuators are affixed to the valve, is secured against the bonnet 18 by mounting assembly 21 which also serves to support and position valve stem 22. Surrounding stem 22 within bonnet 18 is stem packing 23 and access assembly 24 for lubricating the packing.

Cage plug 26 is fastened to the lower end of stem 22 by nut 25 and tack weld 42 which secures a threaded end of stem 22 to a central support section 27. Section 27 is affixed to cage 26 by webs of metal not shown in this cross sectional view. Plug 26 fits securely within hollow circular cage 14. The upper rim of plug 26 contains rim seal assembly 28 which is compressed between the rim of plug 26 and the inside wall of cage 14.

Vertical movement of the stem 22 by a valve actuator, not shown, controls the flow. In the fully closed or no flow position as shown in FIG. 1, the plug 26 seals against seat ring assembly 13 blocking flow around plug 26.

Fluid from inlet passageway 12 flows through port 29 and 30 in plug 26 into a chamber 31 between the bonnet 18, the inside of cage 14 and the plug 26. Rim seal assembly 28, shown in detail in FIG. 3B, prevents flow out of this chamber to outlet passage 12A.

In the open or partially open position, not shown, the actuator lifts the valve stem 22 and plug 26 from the seat assembly 13 allowing the fluid to flow from inlet 12 through the shoulder 11 between seat assembly 13 and plug 26 through openings 15 in cage 14 into outlet passageway 12A. Fluid also flows into ports 29 and 30 but is prevented from reaching outlet 12A as described above.

Figure 2A:
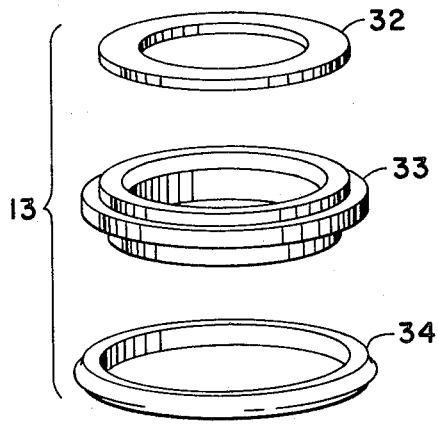
FIG. 2A is an exploded view of a seat ring assembly.

Referring now to FIG. 2, the parts of seat ring assembly 13 are shown in an exploded view in FIG. 2A. Soft seat 32 is positioned above hard (metal) seat ring 33 which rests on spiral wound gasket 34 which thereby supplies an upward thrust on cage 14 in opposition to the compressive force supplied by bonnet 18.

Figure 2B:
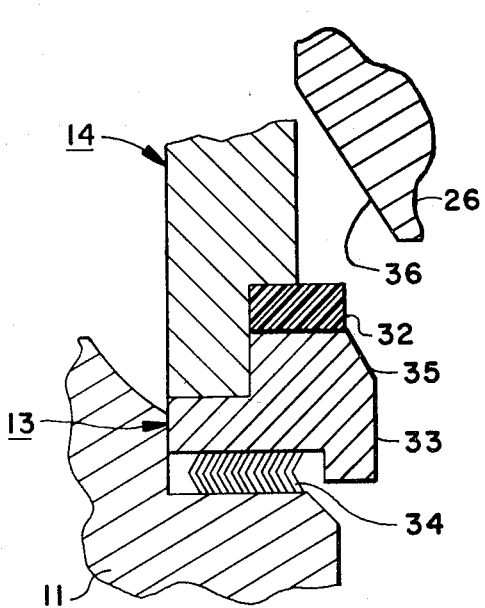
FIG. 2B is a cross sectional view of the seat ring assembly in position between the cage and body.

As shown in FIG. 2B the seat ring assembly 13 is positioned between cage 14 and shoulder 11. The hard seat ring 33 has a bevelled surface 35 which corresponds to a matching bevelled surface 36 of plug 26. Surfaces 35 and 36 provide the metal-to-metal seal if the soft seat 32 is not present or is otherwise inoperable. As plug 26 is urged downward toward the no-flow position surface 36 first contacts soft seat 32 partially deforming it against the matching surface 35 of hard seat 33. This provides the "bubble tight" shut off. As soft seat 32 becomes worn, surface 36 approaches surface 35. Therefore, under extreme conditions, if seat 32 is worn out or removed, there is at least the original metal-to-metal seal.

To install soft seat 32 or replace it, it is only necessary to remove the studs 19 to lift bonnet 18 from the pipe in which the valve is installed. After bonnet 18 is removed, taking with it stem 22 and plug 26, cage 14 can be lifted out exposing soft seat 32 resting on hard seat 33 and gasket 34. Reassembly consists of merely dropping gasket 34 on shoulder 11 upon which is placed seat 33 then seat 32. Cage 14 can then be positioned on seat 32. Top gasket 37, shown in FIG. 3B, is placed on the surface formed by the rim 17 of body 10 and rim 16 of cage 14. The bonnet may then be installed.

Figure 3A:
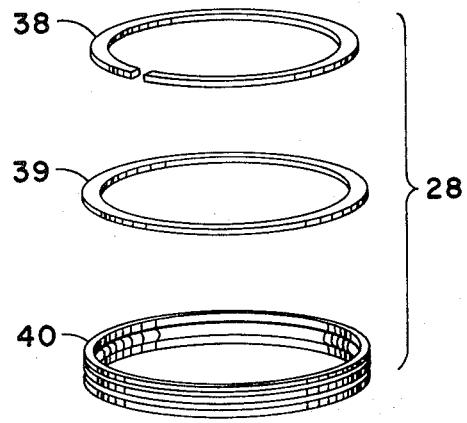
FIG. 3A is an exploded view of the rim seal assembly.
Figure 3B:
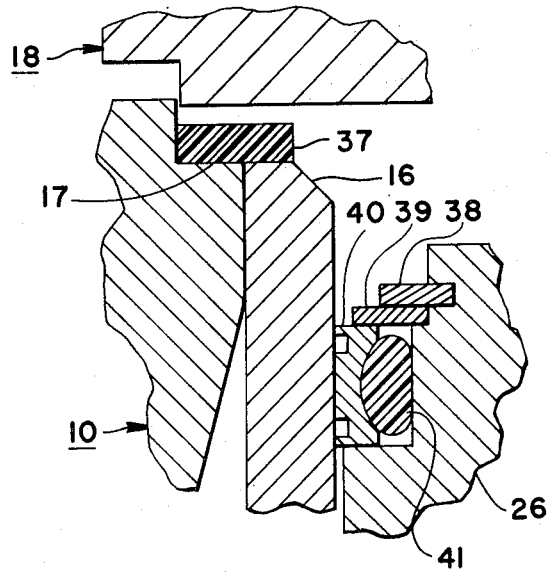
FIG. 3B is a cross sectional view of the rim seal assembly installed in the upper rim of the plug.

FIG. 3A shows in exploded view the relationship of the parts of rim seal assembly 28. Split ring 38 fits above washer 39 which rests on rim seal 40. FIG. 3B shows this in more detail. Into a notched section of the rim of plug 26 is positioned rim seal 40 forced against the inside wall of cage 41 by rubber O ring 14. Washer 39, itself restrained by clip ring 38, restrains rim seal 40 against the bottom of the notch in plug 26. A seal is thus provided between the upper rim of plug 26 and the inner wall of cage 14 separating chamber 31 from outlet passageway 12A.

I claim:

1. A flow control valve for providing bubble tight shut off comprising:
   a valve body including an interior passageway for flow of fluid, said body further including a support shoulder in said interior passageway;
   a hard seat ring resting on said shoulder;
   a soft seat ring resting on said hard seat ring;
   a hollow valve cage resting on said hard seat ring and securing said soft seat ring between said hard seat ring and said cage;
   a valve plug slidably engaged within said cage; and
   a valve bonnet mounted against said valve body for compressively securing said cage, and seats in a fixed relation to said body;
   wherein said valve plug is guided by an inside surface of said cage and said valve plug further includes a rim seal assembly comprising:
   a circular sealing ring resting in a notch at the rim of said plug;
   a resilient ring disposed between said circular sealing ring and said plug urging said sealing ring away from said plug and against said inside surface of said cage; and
   a washer resting on said sealing ring to restrain motion of said ring in a vertical direction.

2. A flow control valve for providing bubble tight shut off comprising:
   a valve body including an interior passageway for flow of fluid, said body further including a support shoulder in said interior passageway;
   a hard seat ring resting on said shoulder;
   a soft seat ring resting on said hard seat ring;
   a hollow valve cage resting on said hard seat ring and securing said soft seat ring between said hard seat ring and said cage;
   a valve plug slidably engaged within said cage; and
   a valve bonnet mounted against said valve body for compressively securing said cage, and seats in a fixed relation to said body;
   wherein an upper rim of said cage and an upper rim of said body form a coplanar surface parallel to a surface of said bonnet;
   said valve further including a flat circular gasket disposed between said bonnet surface and said coplanar surface; and
   a circular spiral wound gasket providing fluid sealing in a radial direction and compressive resistant force in an axial direction positioned between said support shoulder and said hard seat ring urging said hard seat ring upward.

3. A flow control valve structure comprising a valve body and an interior assembly in said body comprising a valve sleeve cage in nested stack assembly on a valve seat ring to be held thereon by a valve bonnet on said valve body, a valve stem and plug combination mounted for valving operation within said cage, said valve seat ring extending radially inward beyond said cage to terminate at least in part with an inner tapered surface, and a readily removable soft seat ring held between said cage and said valve seat ring, said soft seat ring having a portion extending radially inward beyond said cage and along said seat ring, said plug having a tapered periphery for engagement with said inward extension of said soft seat ring to deform said soft seat extension into a plug seat form approaching a continuation of said seat ring taper, with said seat ring taper provided as a back-up seat for said plug taper, beyond said soft seat.

* * * * *